UNITED STATES PATENT OFFICE.

EDWARD J. DE SMEDT, OF WASHINGTON, DISTRICT OF COLUMBIA.

MANUFACTURE OF HYDRAULIC CEMENT.

SPECIFICATION forming part of Letters Patent No. 263,873, dated September 5, 1882.

Application filed August 11, 1882. (No specimens.)

*To all whom it may concern:*

Be it known that I, EDWARD J. DE SMEDT, of the city of Washington, in the District of Columbia, have invented a certain new and useful Improvement in the Manufacture of Hydraulic Cements, of which the following is a specification.

Hydraulic cements are generally produced by calcining limestones which contain a certain quantity of silica $(SiO_3)$ and alumina, $(Al_2O_3,)$ the carbonic acid $(Co_2)$ being expelled therefrom by or during the calcining operation. When the calcined stone contains, as it often does, a slight excess of free anhydrous lime, $(CaO,)$ a quick-setting cement is the result. When the cement is made into mortar heat is given off, and the mortar sets so quickly that it is with difficulty put in place between bricks or in concrete before setting.

It is my object to change the quick-setting cement into a slow-setting cement; and this result I have found can readily, surely, and inexpensively be attained by hydrating the free anhydrous lime contained in the cement, or, in other words, by converting the free anhydrous lime (CaO) into a hydrate of lime, $(CaOH_2O,)$ which, in combination with the other constituents of hydraulic cements, will produce a hydraulic cement that sets slowly and without heating and expansion. The hydrating of the CaO can be readily accomplished. In practice I have found that from one to two parts, by weight, of water to one hundred parts of calcined cement-stone containing an excess of free anhydrous lime will suffice to produce the desired result. The water is combined with the cement by sprinkling it over the calcined stone either before or after the milling or grinding operation. I prefer to add the water before grinding, because a very complete mixing or combination is obtained by the subsequent operation of milling the stone. In case the water is added after the stone is ground the two should be thoroughly mixed and incorporated by means of a suitable mixing or stirring apparatus. The cement thus produced maintains its pulverulent condition, and in no wise differs in consistency and appearance from ordinary cement.

I do not desire to be understood as restricting myself to the proportions hereinbefore given. The more free anhydrous lime a cement contains the more water will be needed to produce the desired result. A few careful tests will enable one to ascertain with certainty the proper quantity of water to be used. An excess of water is of course objectionable. What is necessary is such a proportion of water as will chemically combine with the free anhydrous lime to form a hydrate of lime.

What I claim as new and of my invention is—

The method of producing slow-setting hydraulic cement from cement-stones containing an excess of free anhydrous lime, which consists in adding to the calcined stone, either before or after the grinding or milling operation, water in sufficient quantity to combine with the free anhydrous lime to form a hydrate of lime, substantially as hereinbefore set forth.

In testimony whereof I have hereunto set my hand this 11th day of August, 1882.

E. J. DE SMEDT.

Witnesses:
EWELL A. DICK,
J. WALTER BLANDFORD.